(12) United States Patent
Grober

(10) Patent No.: US 11,999,351 B2
(45) Date of Patent: Jun. 4, 2024

(54) METHOD, DEVICE, AND COMPUTER PROGRAM PRODUCT FOR DETERMINING A FURTHER TEST ROUTE DURING A TEST DRIVE OF A TRANSPORTATION VEHICLE

(71) Applicant: VOLKSWAGEN AKTIENGESELLSCHAFT, Wolfsburg (DE)

(72) Inventor: Florian Grober, Bad Gandersheim (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 476 days.

(21) Appl. No.: 16/712,367

(22) Filed: Dec. 12, 2019

(65) Prior Publication Data
US 2020/0189601 A1    Jun. 18, 2020

(30) Foreign Application Priority Data
Dec. 13, 2018   (DE) ...................... 10 2018 221 708.4

(51) Int. Cl.
| | |
|---|---|
| *B60W 40/06* | (2012.01) |
| *B60W 30/045* | (2012.01) |
| *G01C 21/34* | (2006.01) |
| *G06Q 50/40* | (2024.01) |

(52) U.S. Cl.
CPC .......... *B60W 40/06* (2013.01); *B60W 30/045* (2013.01); *G01C 21/343* (2013.01); *G01C 21/3492* (2013.01); *G06Q 50/40* (2024.01)

(58) Field of Classification Search
None
See application file for complete search history.

(56) References Cited

U.S. PATENT DOCUMENTS

| | | | |
|---|---|---|---|
| 8,706,416 B2* | 4/2014 | Wang ................ | G01C 21/3469 701/533 |
| 10,151,595 B2 | 12/2018 | Huber | |
| 2004/0049339 A1 | 3/2004 | Kober et al. | |
| 2013/0261966 A1 | 10/2013 | Wang et al. | |
| 2017/0115124 A1* | 4/2017 | Mullen ............. | G01C 21/3697 |
| 2017/0298811 A1* | 10/2017 | Santillo .................. | F02B 37/12 |
| 2018/0040176 A1* | 2/2018 | Ogawa ................ | G07C 5/0808 |

(Continued)

FOREIGN PATENT DOCUMENTS

| | | |
|---|---|---|
| AU | 200027641 A1 | 11/2000 |
| CN | 106796115 A | 5/2017 |

(Continued)

*Primary Examiner* — Aniss Chad
*Assistant Examiner* — Madison R. Inserra
(74) *Attorney, Agent, or Firm* — Barnes & Thornburg LLP

(57) ABSTRACT

A method, a device, and a computer program product wherein the further profile of a test route of a transportation vehicle is determined during a test run. Both the loads which are already applied to the transportation vehicle as well as the loads which act on the transportation vehicle on successive sections of road are included in the determination of the further test route. The test route is tailored individually to the transportation vehicle and to a load target value which is attained therewith. The satisfaction of the load target value is ensured in that the test route is adapted at any time in accordance with the actual applications of load and the loads which are expected.

20 Claims, 2 Drawing Sheets

(56) References Cited

U.S. PATENT DOCUMENTS

2018/0201077 A1    7/2018  Xie et al.
2020/0346659 A1*  11/2020  Düser ................. B60W 30/143

FOREIGN PATENT DOCUMENTS

| CN | 107036608 A    |   | 8/2017  |        |            |
|----|----------------|---|---------|--------|------------|
| DE | 4000940 A1     |   | 7/1991  |        |            |
| DE | 19916967 C1    |   | 11/2000 |        |            |
| DE | 10031787 A1    |   | 1/2002  |        |            |
| DE | 102004017660 A1|   | 10/2005 |        |            |
| DE | 102010042964 A1| * | 4/2012  | ......... | G01C 21/3453 |
| DE | 102014003973 A1|   | 9/2014  |        |            |
| DE | 102016218815 A1| * | 3/2018  | ......... | G01C 21/3469 |
| EP | 1045224 A2     |   | 10/2000 |        |            |
| EP | 1297515 A1     |   | 4/2003  |        |            |

* cited by examiner

METHOD, DEVICE, AND COMPUTER PROGRAM PRODUCT FOR DETERMINING A FURTHER TEST ROUTE DURING A TEST DRIVE OF A TRANSPORTATION VEHICLE

PRIORITY CLAIM

This patent application claims priority to German Patent Application No. 10 2018 221 708.4, filed 13 Dec. 2018, the disclosure of which is incorporated herein by reference in its entirety.

SUMMARY

Illustrative embodiments relate to a method, to a device and to a computer program product for determining a further test route during a test run of a transportation vehicle for reaching a load target value.

BRIEF DESCRIPTION OF THE DRAWINGS

Disclosed embodiments will be explained below with reference to the drawings, in which.

DETAILED DESCRIPTION

Figure 1:
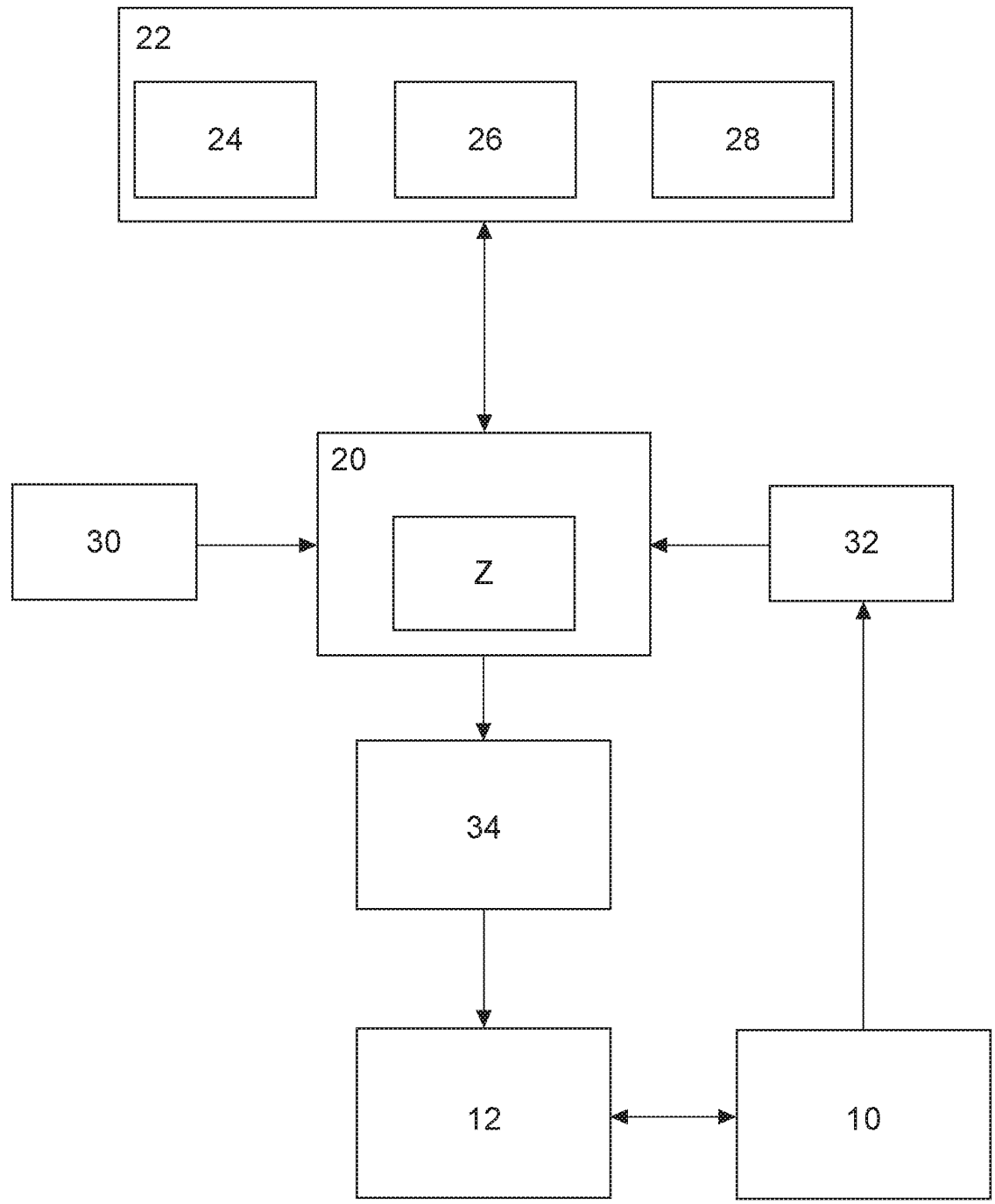
FIG. 1 shows an exemplary embodiment of a disclosed device in a schematic illustration.

In a long-term driving trial, also referred to a vehicle endurance test, the durability of transportation vehicles is tested in the development phase. For this purpose, the transportation vehicle is used by a test driver on a defined circuit at a test site or on public roads. On this circuit, the transportation vehicle must cover a defined operating distance, that is to say a predefined number of kilometers, without damage to be able to be released for production. The test circuit is configured according to various criteria, but according to the loads which are to be expected during operation with a customer. This procedure has a large number of drawbacks.

Firstly, the damage of components on and/or in the transportation vehicle is dependent on the loads acting on the transportation vehicle. However, if the long-term trial takes place on a strictly defined test circuit, in particular, at a test site, only the layout of the route, the speed and the unevenness of the roadway are specified here. The actual loads for the transportation vehicle, such as forces, torques, accelerations and the like, are therefore defined only indirectly. As a result it is not possible to ensure that a provided application of load to the transportation vehicle takes place.

Depending on the type of transportation vehicle, the effects on the transportation vehicle can give rise to loads of different magnitudes owing to the structural configuration of a transportation vehicle. Therefore, it is attempted to configure the test circuits to be as generally valid for as many types of transportation vehicle as possible which is not always possible in practice.

Further influences on the application of load arise from changes of driver owing to shifts, influences of weather conditions and unplanned changes in the test circuit, such as, for example, components and diversions on the test circuit.

Further difficulties arise from the monotonous and tiring, that is to say not very ergonomic, effect of a continuously repeating test circuit on the driver and the number of test transportation vehicles at the same time, the number being limited for reasons of safety.

To summarize, it therefore cannot be ensured that the loads which are provided actually act on the transportation vehicle to be tested, that is to say loads as a result of driving along the route actually act on the transportation vehicle, and/or that the execution is optimized in terms of economic and ergonomic criteria.

In this context, various proposals by which the specified problems are to be solved are disclosed in the prior art.

In Grünitz et al., "Ermittlung der Betriebsbelastungen elektromechanischer Lenkgetriebe mittels belastungserfas sender Software [Determining the operational loads of electromechanical steering gear mechanisms by means of load-sensing software]", in: DVM Report No. 134, Berlin, 2007, p. 89 ff. a method is described with which data which is classified by a steering control unit by applying counting functions and which relates to the loads on the power steering system which occur during operation can be collected. However, the data serve only for monitoring the load in operation by the customer.

In Teutsch, R. et al., "Einsatzspezifische Erprobung als Baustein zur Verringerung des Fahrzeuggewichtes von Lastkraftwagen [Deployment-specific testing as a module for reducing the vehicle weight of trucks]", in: DVM Report No. 138, Clausthal-Zellerfeld, 2011, p. 189 ff., and Weber, M. et al., "A new way to customer loads correlation and testing in truck engineering of Daimler trucks", in: chassis.tech plus, Munich, 2010, a driver guidance system for the testing of trucks is presented which compiles a test circuit individually from various route sections of a test site depending on the purpose of use. The driver guidance system determines the position of all the transportation vehicles located at the test site and calculates on an updated basis, the optimum route for each test site with respect to the capacity utilization of the test site, and to avoid collisions. However, no way of ensuring or even optimizing the application of loads to the transportation vehicle is disclosed.

In Heiden, M. et al., "Erkenntnisgewinn durch die Uberwachung von Schadigungseintrag and Spitzenlasten während eines realen Fahrzeugdauerlaufs [Acquiring knowledge by monitoring damage and peak loads occurring during a real long-term vehicle run]", in: DVM Reports No. 141, Ingolstadt, 2014, p. 173 ff., the equipment of transportation vehicle parts with measuring technology, in particular, with strain gauges is known, the parts being evaluated after the test runs. The evaluation is the basis for a calculation of an operational stability index, referred to as the pseudo damage of the transportation vehicle. From the characteristic values it is possible to determine in conjunction with the operation distance covered by the transportation vehicle, whether the load applied remained the same and the test quality was therefore constant, and whether the load which is applied and the damage which was assumed therewith lies within a predefined target corridor. However, the consideration is carried out retrospectively for the test runs which have taken place so that the problems mentioned above cannot be solved in this disclosure either.

Furthermore, the prior art has disclosed various methods by which a route selection can be carried out on the basis of the route parameters such as curvature, gradient or speed limits, but the route selection is only made in respect of energy-optimized driving or a characteristic of the route layout which is desired by the driver. Some of the methods are aimed here at making available a load characteristic for test runs, but this is not always done with respect to the actually acting loads on the transportation vehicle or the overall load which is to be achieved.

When optimizing the testing of transportation vehicles various challenges exist, specifically achieving the achievement of the provided loads individually for the transportation vehicle under the real conditions during the test runs and the ergonomic and economic configuration of test runs remain unsolved in the prior art.

The disclosed embodiment provide methods and a way for the implementation of the methods so that an individual test route which is coordinated with the transportation vehicle and the actually applied loads and by which the provided loads can be achieved can be predefined, wherein the optimum route is determined in real time during the test run.

The disclosed embodiments provide a method, a device, and a computer program product.

Firstly, the word "loads" and its use in the sense of the application is to be explained. Loads are to be understood in the text which follows as all of the influences on a transportation vehicle which can influence its service life or the service life of its components. The term is therefore not restricted only to forces and moments in the known and customary sense but can mean, for example, the number of rollover cycles of ball bearings or also current flows with respect to electric transportation vehicles. Variables or influences from which forces and/or moments, such as, for example, transportation vehicle accelerations, can be derived are also to be understood as covered by the term loads. In a further configuration, load is also to be understood as meaning the occurrence of situations and therefore loads which are relevant for the functions to be tested.

In a disclosed method for determining a further test route for a transportation vehicle for reaching a load target value during a test run on the basis of loads which are applied to the transportation vehicle, at least the following operations are carried out by a calculation unit:

Linking a position, determined by a position-determining apparatus, of the transportation vehicle on a section of road, road information about this section of road composed of a memory apparatus and of loads which are applied to the transportation vehicle and sensed by a sensor apparatus and have the purpose of determining a load characteristic value for this section of road, Retrieving a test state of the transportation vehicle from the memory apparatus, Calculating an updated test state of the transportation vehicle from the retrieved test state and the load characteristic value, and storing the updated test state in the memory apparatus, Determining possibilities of making a turn at the end of the section of road and a utility value of each of the possibilities of making a turn in respect of attaining the load target value on the basis of the road information and loads which can be expected and are stored in the memory apparatus, for the transportation vehicle, and Selecting the possibility of making a turn with the highest utility value to attain the load target value.

The method is therefore to be carried out during a test run so that a further test route is determined in real time. The term further test route is to be understood as meaning the further profile of the route which a driver of the transportation vehicle is to travel along starting from the present location. The objective of the method here is that the route is selected in accordance with the loads which have already been applied to the transportation vehicle so that a previously defined load target value, that is to say a totality of loads which are to be applied to the transportation vehicle, is achieved as efficiently as possible. The load target value can therefore also be referred to as the maximum test state to be achieved. The load target value is defined, for example, with knowledge of the future requirements of the transportation vehicle and the future use of the transportation vehicle. The testing of a transportation vehicle is concluded when the load target value has been achieved.

The test run can be carried out here both on a test site, for example, an enclosed test site, as well as on public roads or a combination of both.

To carry out the disclosed method, a suitable calculation unit links a position of the transportation vehicle is determined by a position-determining apparatus on a section of road, road information relating to this section of road from a memory apparatus and loads of the transportation vehicle which are sensed by a sensor apparatus.

A section of road is intended here to be a part of a road profile whose characteristic properties remain essentially the same. A section of road is bounded by intersection points at which further sections of road branch off or turn off. Each of these outgoing road sections is referred to below as a possibility of making a turn. Straight travel ahead at such an intersection point is also to be understood to as a possibility of making a turn.

Both the position of the transportation vehicle and the sensed loads can be received and processed as data from an independent position-determining apparatus or sensor apparatus. In this respect, the apparatus should be embodied with a suitable data interface which permits the acquired data to be transmitted to the calculation unit and permits further processing by the latter. Such a stand-alone device can be, for example, a GPS receiver which determines a position of the transportation vehicle in GPS coordinates, but also the position-determining apparatus of a cellphone which is carried along in the transportation vehicle and is designed to exchange data with the calculation unit. The calculation unit can, however, also be embodied itself with sensors and/or an internal position-determining apparatus which determines the position of the transportation vehicle so that the sensors acquire measured values, or the internal position-determining apparatus determines a position, which measured values or positions are further processed directly.

The position data and the applied loads are linked with road information about the section of road on which the transportation vehicle is located. The road information is essentially a digital road map including a list of sections of road which can be travelled on and the characteristic properties thereof. The term can be travelled on here means that it is possible to drive on the road with a transportation vehicle, and also that the section of road lies within a defined test area in which test runs can be carried out. Reduction to a predefined test area can be appropriate if the transportation vehicle has to return to its starting point at the end of a driver's shift and can therefore only cover a certain distance to this starting point.

On the basis of the previously determined position of the transportation vehicle, the calculation device retrieves, for this purpose, the road information which describes, for example, the length, gradient and curvature of a section of road, relating to the section of road on which the transportation vehicle is located from the memory apparatus. This memory apparatus can be part of the calculation unit or can be embodied separately and connected to the calculation unit.

To determine a load characteristic value relating to the road section on which the transportation vehicle is located, this road information is linked to the loads which are applied to the transportation vehicle and sensed by the sensor apparatus, and the position data. This is to be understood as meaning that the sensor data are assigned to the characteristic properties of the road section and the respective specific position of the transportation vehicle. By applying mathematical functions, in particular, classifying functions such as, for example, rainbow counting, class boundary transgression counting, range pair counting, dwell time counting, frequency counting and calculation methods for the operational stability, such as, for example, the linear damage accumulation, the calculation unit can calculate the loads which have actually occurred and have been applied to the transportation vehicle. It is therefore possible, for example, to determine the effect of a bend radius or of an inclination of the section of road on the transportation vehicle and determine the load actually achieved using the sensor data which has been acquired at the same time. From the respectively acquired loads it is possible to determine the load characteristic value for this section of road.

When a multiplicity of loads act on the transportation vehicle at the same time, a load set, that is to say a multiplicity of load characteristic values which relate to one or more types of load, can also be formed. The load sets can be used in the same way in the method as a load characteristic value. Therefore, the term "load characteristic value" is used below both as such and as equivalent to the term "load set" or "load sets".

A test state of the transportation vehicle is retrieved from the memory apparatus. This test state represents which loads overall have already acted on the transportation vehicle. The test state therefore represents the loads which have actually already been applied to the transportation vehicle. These loads may have been determined during the test run which is carried out at this time, but also by a test run which was carried out previously, that is to say earlier. The test state can also be acquired separately here for individual types of load and updated, or as a test state for all the applied loads overall.

An updated test state is calculated from this retrieved test state and the determined load characteristic value. In the simplest case, the load characteristic value is added to the retrieved test state and the sum reveals the updated test state. However, more complex calculation methods which take into account external influences during the test run, for example, through weighted influencing factors, are also possible.

The updated test state is saved in the memory apparatus. It is therefore stored in the memory apparatus. Therefore, the previously retrieved test state can be overwritten, or any further updated test state can be successively stored, in particular, with information about the time when this test state was reached.

On the basis of the position of the transportation vehicle and the road information which is available with respect thereto in the memory apparatus the possibilities of making a turn which relate to the section of road on which the transportation vehicle is located are then retrieved. Testing as to which possibilities of making a turn occur at the end of the section of road which is currently being travelled on. On the basis of the characteristic values of the section of road from the memory apparatus and also loads which can be expected and are stored in the memory apparatus, for the sections of road which follow the section of road which is currently being travelled on, it is possible to determine a utility value for each of the possibilities of making a turn with respect to the load target value which is still to be achieved for the transportation vehicle, that is to say the totality of loads which are to be applied to the transportation vehicle, and the updated test state. This utility value describes here the contribution which each of the possibilities of making a turn and the sections of road which adjoin it makes for reaching the load target value, that is to say which of the possibilities of making a turn is most likely to lead to the load target value being reached.

Criteria for the determination of the utility value can be the following questions:
 To what extent would travelling on the section of road contribute to reaching the load target value?
 Can high loads be achieved there which are only rarely possible elsewhere, for example, as a result of very tight bends?
 Is the test state for a type of load particularly low so that the type should be run in?
 What expenditure in terms of time and/or distance is associated with driving on the section of road?

Loads which are expected or can be expected are load applications to the transportation vehicle which have a higher probability of acting on the transportation vehicle owing to the characteristics of a section of road.

The utility values for the various possibilities of making a turn which follow the section of road which is currently being travelled on are compared and the possibility of making a turn and the following section of road with the highest probability value with respect to reaching the load target value selected.

With the disclosed method it is therefore possible to determine, during a test run, a further test route which, while taking into account the loads which have already actually been applied to the transportation vehicle, the updated test state which is achieved as a result and the expected loads is selected in a subsequent section of road in such a way that the aimed-at load target value is achieved therewith as effectively and economically as possible.

At the same time, it is therefore also possible to react to external influences and to adapt the further test route as has already been explained below. In addition, a test run can be configured in this way such that the route is full of variety and does not have a fatiguing effect on the driver of the transportation vehicle as a result of continuous repetition of the same sections of road.

In a first disclosed embodiment there is provision that the possibility of making a turn with the highest utility value is output on an output unit to the driver of the transportation vehicle. For example, the information about the selected possibility of making a turn can be transmitted visually, acoustically and/or in a tactile fashion to the driver of the transportation vehicle. For this purpose, the calculation device can be embodied with an output unit or be connected to an output unit. This output unit can be implemented, for example, in a configuration similar to a known navigation system so that the driver can be guided along the further test route determined in this way, by arrows and/or marking of the optional possibility of making a turn on a map view and/or by announcements of the optional possibility of making a turn.

In another disclosed embodiment, the determined load characteristic value of a section of road is stored in the memory apparatus. The load characteristic value which is determined as explained above is therefore used not only to determine an updated test state but is also transmitted into the memory apparatus and stored there. Therefore, such a load characteristic value can, for example, also be used if a test route has to be implemented to reach a starting point or an intermediate target or in the case of repetition of the test route again along the same section of road, to add to and/or update the loads which can be expected. The determined load characteristic value for each section of road which is travelled on can therefore be used for future journeys as a load which can be expected.

In a subsequent disclosed embodiment there is provision that the loads which can be expected for the transportation vehicle have been determined by earlier test runs. The load characteristic values which are stored in the memory apparatus therefore do not have to originate only from the currently executed test run that has been explained above, but rather can also be used from the determination during a previously executed test run. Loads which can be expected which have been determined with the same transportation vehicle or with a very similar transportation vehicle are optional. A very similar transportation vehicle is to be a transportation vehicle with essentially similar properties.

Alternatively or additionally, in the event of errors in suitable data with regard to loads which can be expected, the latter can be estimated by the application of methods from mathematics, physics and/or artificial intelligence, such as, for example, by regression analysis or neural networks on the basis of the present road information and, if appropriate, load characteristic values which have already been stored.

A subsequent disclosed embodiment provides that the road information contains characteristic information of a section of road, in particular, the name of the road, associated GPS coordinates, type of road, permissible maximum speed, length, curvature, inclination, underlying material, roughness of underlying surface and/or obstacles which are present. Obstacles are intended in this example to be understood as being all structural features of traffic infrastructure, in particular, of the section of road being travelled on, which, owing to the driving maneuvers caused by the features, may be relevant for application of a load to the transportation vehicle. These include elevated portions of the ground, depressions in the ground, level crossings chicanes, constrictions in the roadway, crosswalks, sets of traffic lights, stop signs and the like. These characteristic values permit, in conjunction with the loads which have been applied and which have been sensed by the sensor apparatus, a very precise load characteristic value to be determined taking into account a multiplicity of individual characteristic values of the section of road, which values each per se influence the applied load. The load characteristic value, and therefore also the loads which can be expected on sections of road which have not yet been travelled on, can therefore be determined more precisely with comparable or very similar characteristic properties.

Further information which can be used to determine or characterize the load characteristic value and document it, that is to say to store it in the memory apparatus, is information about the weather during the test run, the traffic density during the test run and/or whether the test run has been carried out during public holidays, holiday times and/or during the rush hour. This further information can be of particular benefit for determining the further test route, to estimate, in accordance with the conditions prevailing during the currently executed test run, whether comparable conditions are present and therefore also comparable load applications, or under certain circumstances more suitable load applications can also be achieved with respect to the load target value.

In at least one disclosed embodiment, a partial utility value is determined for each possibility of making a turn of n successive sections of road, and a utility value is determined therefrom for each combination of the n successive sections of road, and the combination of the highest utility value with respect to reaching the load target value is selected.

A calculation horizon which predefines the sequence of number n of sections of road can be selected in accordance with the efficiency of the calculation unit and/or a desired preview of the method. Therefore, it can be predefined, for example, that not only the next possibility of making a turn is to be taken into account for the determination of the utility value but also, for example, three successive possibilities of making a turn (n=3) are to be taken into account for the determination of the further test route. In this case, the number of possibilities of making a turn which are present for the section of road which is currently being travelled on is therefore retrieved from the memory unit and all the possibilities of making a turn are then determined again for each of the subsequent sections of road, and so on, until all the possibilities of making a turn have been determined for the three intersection points which follow the section of road being currently travelled on and at which possibilities of making a turn arise. Road information and loads which can be expected are available for each of these sections of road so that a partial utility value can be determined for each of these sections of road. A utility value is determined for all of the possible combinations from the partial utility values of the individual road sections, which utility value is therefore an overall utility value for the respective combinations of road sections. This can be done by adding or else by weighted combination of the individual partial utility values under predefined conditions. By weighting it is possible, for example, to ensure that sections of road at a greater distance have a smaller influence on the overall utility value for the respective combinations of sections of road.

To determine the partial utility values, an anticipated updated test state should also be determined from each section of road on the basis of the road information and the loads which can be expected, so that an anticipated updated overall test state is determined for each of the possible combinations of sections of road and can be compared with the load target value.

By comparing the overall utility values of the individual combinations of sections of road, the highest overall utility value and therefore the most suitable combination of sections of road for reaching the target load value is then selected. The combination of sections of road which is selected in this way does not have to be defined in the further proceedings but rather can be newly determined after each section of road has been travelled on. This is useful since, on the one hand, differences between expected and actually occurring loads can arise when travelling along a section of road, and, on the other hand, the calculation horizon of n is always maintained as a preview.

In this context, firstly only the selection of the next selected section of road, as the next to be travelled on, can be transmitted to the driver of the transportation vehicle. To permit predictive driving, it is, however, also possible to make available the subsequently favored sections of road as additional information to the driver.

This exemplary embodiment of the disclosed method permits predictive consideration of the test run by taking into account possible external predefinitions. However, this procedure may also ensure that a transportation vehicle does not make use of a possibility of making a turn which achieves a high utility value for a subsequent section of road but then it is only possible to travel through sections of road which each achieve only low utility values so that in its entirety the test run brings about only a low level of progression of the test state and therefore only makes a small contribution to reaching the load target value. Furthermore, this procedure can also be applied to simulate a route of a test run on the basis of the loads which are expected, and therefore virtually plan in advance and at the same time take in account the loads which have already been applied to the transportation vehicle.

Additionally or alternatively, the method which is disclosed here can also be used to propose a route on which a smallest possible application of load to the transportation vehicle occurs. This disclosed embodiment can be implemented by determining the utility value of a section of road with respect to a smallest possible application of load and selecting sections of road for the further course of the test route, which sections have a utility value which corresponds to the lowest possible load for the transportation vehicle. The utility value of a section of road is therefore calculated in such a way that the applied loads are as low as possible. Such a use of the method could be used by drivers of a transportation vehicle who wish to drive the transportation vehicle as gently as possible to increase its service life and to minimize the wear of the transportation vehicle and of its components. The driving comfort during travel can also be a motivation for a selection of a route with a low load application. This can be significant with respect to autonomous driving during which the transportation vehicle occupants rest or engage in other activities. Since the transportation vehicle occupant's eyes no longer actually follow the scenery which is moving past, and therefore in contrast to the sense of balance, do not register their own locomotion, there may be conflict between the two sensory perceptions, resulting in an uncomfortable feeling. Therefore, a gentle comfortable driving style is particularly important for autonomous driving.

A disclosed method for determining a further test route for a transportation vehicle for reaching a load target value during a test run on the basis of loads which have been applied to the transportation vehicle is embodied with a memory unit, with which road information, loads which can be expected for the transportation vehicle and a test state of the transportation vehicle can be retrieved and stored, and a calculation unit which is designed to carry out the above described method.

The memory apparatus is therefore designed in such a way that road information, loads which can be expected for the transportation vehicle and a test state of the transportation vehicle are stored therein in a retrievable fashion and can be retrieved, and that such information can also be stored in the memory apparatus. This permits the use of the stored information for the above method which is carried out, but also its updating, supplementation and progression.

The calculation unit is designed here to determine or receive position data and sensor data, to retrieve road information from the memory unit, to link it to the position data and the sensor data, and to determine a load characteristic value therefrom. It is also designed to retrieve a test state from the memory apparatus and to determine an updated test state with the load characteristic value and to store it in the memory apparatus. Finally the calculation unit is designed to determine the further test route as described above by retrieving the possibilities of making a turn of a road section from the memory apparatus, determining a utility value for each possibility of making a turn and selecting the possibility of making a turn with the highest utility value.

The disclosed device can have a position-sensing device for determining a position of the transportation vehicle and/or a sensor apparatus for sensing loads which are applied to the transportation vehicle and/or an output unit for transmitting the selected possibility of making a turn to a driver of the transportation vehicle. The disclosed device can therefore itself be embodied with a position-sensing device and/or a sensor apparatus and/or an output unit, but it can be simultaneously or alternatively connected to one or more of these devices or units. If the calculation unit is connected to one or more of these devices or units, they should make available suitable data interfaces to permit an exchange of data, that is to say provision of the measured values or data of the devices or units to the calculation unit. The separate disclosed embodiment of the specified devices or units permits the calculation unit to be made more compact, and, for example, also to interact with alternating devices or units, so that the latter can be adapted to the respective requirements, for example, with respect to the sensing accuracy, or that it can be exchanged easily when there is a defect.

In at least one disclosed embodiment, in the device the memory apparatus is formed with a database for storing road information and/or a database for storing load characteristic values. Accordingly, a database for storing the characteristic road information is to be provided in the memory unit. Additionally or alternatively, a database for storing load characteristic values can be present in the memory apparatus. The memory apparatus can also have further storage structures which are provided for saving or storing a wide variety of information. A separate storage structure for saving or documenting the updated test state can therefore be implemented. The separate disclosed embodiment of individual storage structures and/or databases has the benefit that the respective structure can be adapted individually to the requirements of the respective data collection without experiencing restrictions owing to the rest of the data structures and without becoming too complex. In addition, in this way data exports can be carried out simply and in a targeted fashion, for example, to transmit the data about the load which can be expected into a transportation vehicle with essentially similar properties.

A computer program product for carrying out the disclosed method is also claimed, with a disclosed device. The product is also to include a system, a data carrier and software which are suitable or designed for carrying out the disclosed method.

The various disclosed embodiments which are specified in this application can be combined with one another unless stated otherwise in an individual case.

The disclosed method and its implementation on a disclosed device and/or with the disclosed computer program product has a large number of benefits.

During the configuration of a test route it was therefore in the past always necessary to make a compromise between the various types of load which were to be tested. A test predefinition on the basis of specific, that is to say actually applied, loads can therefore be used to make the testing significantly more precise and to separate it according to the type of transportation vehicle.

The long-term driving trial of transportation vehicles is made significantly more flexible so that there is no need to travel cyclically along a test route which has been defined in advance. Through the optional use of public roads it is additionally possible to make the test area significantly larger. In addition it is to be expected that the testing is less monotonous for the test driver and significantly closer to real conditions.

The load target value can be predefined overall or for individual types of load. The test state and the coordination with the load target value no longer occur on the basis of the distance travelled by a transportation vehicle but on the basis of loads which have actually been applied to the transportation vehicle. The actual satisfaction of the test requirements is ensured by the load-oriented evaluation on the basis of the progress of the test which is oriented toward the distance travelled. Overall, the test quality therefore improves significantly. This leads to higher product reliability for the customer and allows the manufacturer to expect lower warranty costs.

These applied loads are correlated with the road information in a positionally accurate fashion and used to supplement and/or update loads which are expected for these sections of road, so that a very good estimate of the load application which is to be expected is possible.

FIG. 1 shows an exemplary embodiment of the sequence of the disclosed method and the interaction of the components of the disclosed device.

The disclosed device has a calculation unit 20 in which a load target value Z is predefined and stored. Furthermore, the device comprises a memory apparatus 22, a position-determining apparatus 30, a sensor apparatus 32 and an output unit 34. However, in one alternative refinement the position-determining apparatus 30 and/or the sensor apparatus 32 can also be embodied as separate elements of the device which are connected only to the calculation unit 22. The same applies to the output unit 34.

Arrows between the components of the device illustrate the interaction. Therefore, an arrow with one arrow tip signifies that data or information is transmitted only in the direction shown by the arrow, and an arrow with a double tip signifies transmission or exchange in both directions.

The memory apparatus 22 is formed in a database 24 for saving road information, a database 26 for saving load characteristic values K and a storage structure 28 for storing an updated test state $E_{i+1}$.

During a test run, the position-determining apparatus 30 determines a current position of the transportation vehicle 10 on a section 50 of road and transmits it to the calculation unit 20. On the basis of the position, the calculation unit 20 retrieves road information from the database 24 relating to this section 50 of road, which road information contains characteristic features of the section 50 of road. This can be the type of road, permissible maximum speed, length, curvature, inclination, underlying material, roughness of underlying surface and/or obstacles which are present.

At the same time, the sensor apparatus 32 determines measured values which arise through the interactions during the travel of the section 50 of road, and transmits them to the calculation unit 20. The position of the transportation vehicle 10, the associated road information and the sensor data are linked to one another, and a load characteristic value K is determined for at least one type of load, which load characteristic value K describes the loads B which are actually applied to the transportation vehicle 10. This load characteristic value K is transmitted into the database 26 and saved there.

The test state $E_i$ is then retrieved from the storage structure 28. An updated test state $E_{i+1}$ is determined from the test state $E_i$ and the load characteristic value K. The updated test state $E_{i+1}$ is transmitted into the storage structure 28 and continuously stored there with what is referred to as a timestamp, which contains the date, time and/or distance travelled by the transportation vehicle in the determined test state $E_{i+1}$.

To determine the further test route for the transportation vehicle 10, the possibilities 52 of making a turn at the end of the section of road 50 are then retrieved from the database 24 by the calculation unit 20. On the basis of the road information which is stored in the database 24 and the loads KE which can be expected and which are stored in the database 26, a utility value N of the possibility 52 of making a turn to reach the load target value Z is determined for each possibility 52 of making a turn. The loads KE which can be expected have been determined during earlier travel by the transportation vehicle 10.

The possibility 52 of making a turn with the highest utility value N to reach the load target value Z is selected and transmitted visually, acoustically and/or in a tactile fashion to the driver 12 of the transportation vehicle 10 via the output unit 34. The output unit 34 can be, for example, a display device on which the information is transmitted to the driver 12 visually and/or acoustically by an announcement.

The driver 12 proceeds with the test route as predefined so that new effects are produced on the sensor apparatus 32 and the calculation unit 20 carries out the method again for the next section 50 of road.

Figure 2:
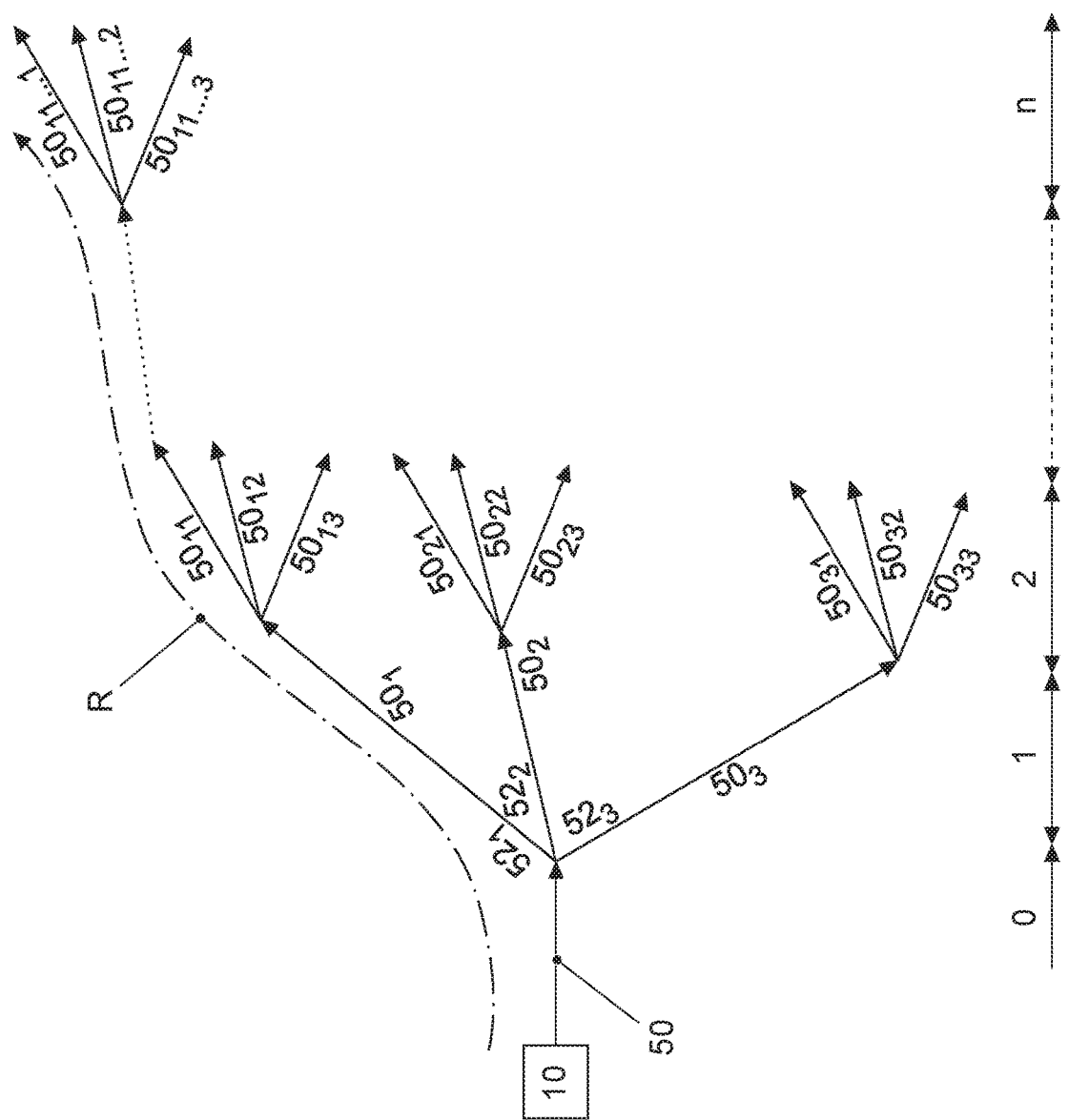
FIG. 2 shows the basic procedure when determining the further test route.

The disclosed method can be carried out not only for a subsequent section 50 of road on the test route but also for a number n of subsequent sections 50 of road, as has been described below by way of example with reference to FIG. 2.

In this context, a transportation vehicle 10 is located on a section 50 of road. To determine the further test route, n further sections 50i of road are to be taken into account. The number n describes the viewing horizon and is illustrated as a sequence of double arrows in the lower region of FIG. 2.

The number n can be selected such that a desired prediction quality with respect to reaching the load destination value Z is achieved. However, it can also be limited by the available computing power of the calculation unit 20. As soon as the transportation vehicle travels along a new section 50 of road, the number of possibilities 52 of making a turn is determined for this section 50 of road. To explain better, they are provided below with indices. In the present example, three possibilities 521, 522 and 523 of making a turn are illustrated at the end of the current section 50 of road. However, any other number of possibilities 52 of making a turn can also be present.

For each of the sections 501, 502 and 503 of road which are formed at the possibilities 521, 522 and 523 of making a turn, in each case a partial utility value N1, N2 and N3 is determined. In addition, the number of the next possibilities 521i, 522i and 523i of making a turn is determined in each case at the end of these sections 501, 502 and 503 of road. The index of the possibilities of making a turn is added to the index of the previous possibility 521, 522 and 523 of making a turn for the sake of illustration. For the sake of better clarity in FIG. 2, the further possibilities 52i of making a turn are not characterized separately but only the sections 50i of road which are formed therewith. For FIG. 2 it is possible to use the indices to track which possibilities 52i of making a turn have been respectively selected.

The operations are repeated continuously until a number n of successive sections 50i of road is reached for each combination of sections of road formed in this way.

A partial utility value Ni is determined again for each of the sections 50i of road which are determined in this way. A utility value of the combination is calculated from the partial utility values Ni of each possible combination of sections of road, optionally using a weighting which includes sections $50i$ of road which are further away and which have a smaller weighting. Further away is intended to mean sections of road which lie essentially closer to the viewing horizon.

In addition, an updated test state $E_{i+1}$ is estimated incrementally for each of the sections $50i$ of road. For this purpose, a test state $E_i$ which is to be reached up to a respective section $50i$ of road is determined. During the determination thereof the loads KE which are to be expected and the road information relating to each of the sections $50i$ of road which have been travelled on until they are taken into account, and the resulting anticipated load characteristic value Ki is added to the test state Ei which has been estimated previously, to estimate the anticipated updated test state $E_{i+1}$.

The combination of sections of road with the highest utility value N can be selected from the totality of the utility values of all the resulting combinations of sections of road on the basis of the estimated updated test states $E_{i+1}$. In FIG. 2, the selected test route R is illustrated by an arrow formed from dot-dash lines. This selected test route R can then be transmitted entirely or partially to the driver 12 of the transportation vehicle 10.

LIST OF REFERENCE SYMBOLS

10 Transportation vehicle
12 Driver
20 Calculation unit
22 Memory apparatus
24 Database for storing road information
26 Database for storing load characteristic values (K)
28 Storage structure for saving the updated test state ($E_{i+1}$)
30 Position-determining apparatus
32 Sensor apparatus
34 Output unit
50 Section of road
52 Possibility of making a turn
B Load
$E_i$ Test state
$E_{i+1}$ Updated test state
K Load characteristic value
$K_E$ Load which can be expected
N Utility value
R Selected test route
Z Load target value

The invention claimed is:

1. A device for determining a further test route and updating route guidance for a transportation vehicle for reaching a target load value during a test run based on loads which are applied to the transportation vehicle, a transportation vehicle position, and route options available based on the transportation vehicle position, the device comprising:
a memory apparatus with which road information, loads which are expected for the transportation vehicle, and a test state of the transportation vehicle are retrieved and stored; and
a calculation unit configured to, in realtime:
link the transportation vehicle position, determined by a position-determining apparatus of the transportation vehicle, on a road section to information about the road section including loads which are applied to the transportation vehicle on the road section and sensed by a sensor apparatus and stored in the memory apparatus for determination of a load characteristic value for the road section;
retrieve the test state of the transportation vehicle from the memory apparatus, the test state comprising all the loads that have already been applied to the transportation vehicle up to a point when the test state was last updated;
calculate an updated test state of the transportation vehicle from the retrieved test state and the load characteristic value;
store the updated test state in the memory apparatus;
determine turn possibilities at the end of the road section and a utility value of each of the turn possibilities with respect to attaining the target load value based on the road information and loads which are expected and are stored in the memory apparatus for the transportation vehicle, wherein the road information and loads which are expected are repeatedly calculated for a next predefined number, n, of road segments throughout the test state;
select the turn possibility with the highest utility value to attain the target load value based on a totality of loads to be applied and other loads that have already been applied to achieve a maximum test state as efficiently as possible, and
update a route guidance display with the selected possibility.

2. The device of claim 1, further comprising the position-determining apparatus for determining the position of the transportation vehicle and/or the sensor apparatus for sensing loads which are applied to the transportation vehicle and/or an output unit for transmitting the selected turn possibility to a driver of the transportation vehicle.

3. The device of claim 1, wherein the memory apparatus is formed with a database for storing road information and/or another database for storing load characteristic values.

4. The device of claim 1, wherein the turn possibility with the highest utility value is output on an output unit to a driver of the transportation vehicle.

5. The device of claim 1, wherein the determined load characteristic value of the road section is stored in the memory apparatus.

6. The device of claim 1, wherein the loads expected for the transportation vehicle are determined by earlier test runs.

7. The device of claim 1, wherein the road information contains characteristic information of the road section.

8. The device of claim 1, wherein a partial utility value is determined for each turn possibility of the n successive sections of road, and a utility value is determined therefrom for each combination of the n successive sections of road, and the combination of the highest utility value with respect to reaching the load target value is selected.

9. A non-transitory computer program product including computer-implemented instructions for carrying out a method for determining a further test route and updating route guidance for a transportation vehicle for reaching a target load value in real time during a test run based on loads which are applied to the transportation vehicle, a transportation vehicle position and route options available based on the transportation vehicle position, when the computer-implemented instructions are performed on a computer processor to provide a calculation unit, wherein the computer-implemented instructions comprise:
linking the transportation vehicle position, determined by a position-determining apparatus, on a section of road, road information about this section of road composed of loads which are applied to the transportation vehicle and sensed by a sensor apparatus and stored in a memory apparatus and determine a load characteristic value for this section of road;

retrieving a test state of the transportation vehicle from the memory apparatus, the test state comprising all the loads that have already been applied to the transportation vehicle up to a point when the test state was last updated;

calculating an updated test state of the transportation vehicle from the retrieved test state and the load characteristic value and storing the updated test state in the memory apparatus;

determining turn possibilities at the end of the section of road and a utility value of each of the turn possibilities in respect to attaining the target load value based on the road information and loads which are expected and are stored in the memory apparatus for the transportation vehicle, wherein the road information and loads which are expected are repeatedly calculated for a next pre-defined number, n, of road segments throughout the test state;

selecting the turn possibility with the highest utility value to attain the target load value based on a totality of loads to be applied and other loads that have already been applied to achieve a maximum test state as efficiently as possible, and updating a route guidance display with the selected possibility.

10. The computer program product of claim 9, wherein the turn possibility with the highest utility value is output on an output unit to a driver of the transportation vehicle.

11. The computer program product of claim 9, wherein the determined load characteristic value of the section of road is stored in the memory apparatus.

12. The computer program product of claim 9, wherein the loads expected for the transportation vehicle are determined by earlier test runs.

13. The computer program product of claim 9, wherein the road information contains characteristic information of the section of road.

14. The computer program product of claim 9, wherein a partial utility value is determined for each turn possibility of the n successive sections of road, and a utility value is determined therefrom for each combination of the n successive sections of road, and the combination of the highest utility value with respect to reaching the load target value is selected.

15. A method for determining a further test route and updating route guidance for a transportation vehicle for reaching a target load value during a test run based on loads which are applied to the transportation vehicle, a transportation vehicle position and route options available based on the transportation vehicle position, wherein at least the following operations are carried out by a calculation unit:

linking the transportation vehicle position, determined by a position-determining apparatus, on a section of road, road information about this section of road composed of loads which are applied to the transportation vehicle, sensed by a sensor apparatus and stored in a memory apparatus, and determining a load characteristic value for this section of road;

retrieving a test state of the transportation vehicle from the memory apparatus, the test state comprising all the loads that have already been applied to the transportation vehicle up to a point when the test state was last updated;

calculating an updated test state of the transportation vehicle from the retrieved test state and the load characteristic value and storing the updated test state in the memory apparatus;

determining turn possibilities of at the end of the section of road and a utility value of each of the turn possibilities in respect of attaining the target load value based on the road information and loads which are expected and are stored in the memory apparatus for the transportation vehicle, wherein the road information and loads which are expected are repeatedly calculated for a next predefined number, n, of road segments throughout the test state;

selecting the turn possibility with the highest utility value to attain the target load value based on a totality of loads to be applied and other loads that have already been applied to achieve a maximum test state as efficiently as possible, and updating a route guidance display with the selected possibility.

16. The method of claim 15, wherein the turn possibility with the highest utility value is output on an output unit to a driver of the transportation vehicle.

17. The method of claim 15, wherein the determined load characteristic value of the section of road is stored in the memory apparatus.

18. The method of claim 15, wherein the loads expected for the transportation vehicle are determined by earlier test runs.

19. The method of claim 15, wherein the road information contains characteristic information of the section of road.

20. The method of claim 15, wherein a partial utility value is determined for each turn possibility of the n successive sections of road, and a utility value is determined therefrom for each combination of the n successive sections of road, and the combination of the highest utility value with respect to reaching the load target value is selected.

* * * * *